United States Patent
Yamamoto et al.

(10) Patent No.: US 10,121,068 B2
(45) Date of Patent: Nov. 6, 2018

(54) INFORMATION PROCESSING APPARATUS, INFORMATION PROCESSING METHOD AND PROGRAM

(71) Applicant: CANON KABUSHIKI KAISHA, Tokyo (JP)

(72) Inventors: Shinji Yamamoto, Yokohama (JP); Tomoya Honjo, Tokyo (JP); Hiroshi Tojo, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/234,855

(22) Filed: Aug. 11, 2016

(65) Prior Publication Data

US 2017/0053409 A1    Feb. 23, 2017

(30) Foreign Application Priority Data

Aug. 18, 2015 (JP) .................. 2015-161265

(51) Int. Cl.
*G06K 9/00* (2006.01)

(52) U.S. Cl.
CPC .............. *G06K 9/00362* (2013.01)

(58) Field of Classification Search
CPC ............................... G06K 9/00362
USPC ........ 382/103, 190, 227, 128, 201; 345/158; 348/222.1, 231.4, 229.1, 169; 706/20; 707/737, 802, 806, 913
See application file for complete search history.

(56) References Cited

U.S. PATENT DOCUMENTS

| | | | | |
|---|---|---|---|---|
| 8,934,724 B2* | 1/2015 | Baba | ............... | G06K 9/00677 382/227 |
| 9,558,212 B2* | 1/2017 | Nakamura | ........ | G06F 17/30244 |
| 2006/0228005 A1* | 10/2006 | Matsugu | ............ | G06K 9/00362 382/116 |
| 2009/0080711 A1* | 3/2009 | Yokoi | ............... | G06K 9/00362 382/116 |
| 2014/0112553 A1* | 4/2014 | Yamaguchi | ............. | G06F 21/32 382/118 |
| 2015/0294144 A1* | 10/2015 | Konishi | ................. | H04N 7/188 382/103 |
| 2015/0302256 A1* | 10/2015 | Ikeda | ................. | G06K 9/00771 382/103 |

FOREIGN PATENT DOCUMENTS

| | | |
|---|---|---|
| JP | 2011-060024 A | 3/2011 |
| JP | 2013-196294 A | 9/2013 |
| JP | 2015-002547 A | 1/2015 |

\* cited by examiner

*Primary Examiner* — John Strege
(74) *Attorney, Agent, or Firm* — Canon U.S.A., Inc. IP Division

(57) ABSTRACT

An information processing apparatus includes a detecting unit, an extracting unit, a managing unit, and a deriving unit. The detecting unit detects an object from an image. The extracting unit extracts a feature amount of the object detected by the detecting unit. The managing unit manages an element in the object detected by the detecting unit in association with the feature amount of the object in the element. The deriving unit derives a reliability indicative of a certainty for identifying an object with respect to the feature amount of the element.

22 Claims, 7 Drawing Sheets

INFORMATION PROCESSING APPARATUS, INFORMATION PROCESSING METHOD AND PROGRAM

BACKGROUND OF THE INVENTION

Field of the Invention

The present invention relates to an information processing apparatus, an information processing method, and a program.

Description of the Related Art

In the past, technologies have been disclosed which receive video images from a plurality of cameras provided in a wide area such as a shopping mall or an airport over a network and analyze the video images to track a suspicious character. In order to identify a human figure imaged by one camera and a human figure imaged by another camera, a feature amount of the human figure captured by the one camera may be recorded. Then, a feature amount of the human figure captured by the other camera and the already recorded feature amount may be compared to identify the human figure if a high similarity level is determined. According to Japanese Patent Laid-Open No. 2015-2547, the orientation of a human figure may be estimated from the direction of movement of the human figure. Features in an observable range are compared for higher accuracy of identification of human figures. Thus, tracking results of human figures captured by cameras can be associated so that a human figure over the plurality of cameras can be tracked.

In identifying a human figure imaged by one camera and a human figure imaged by another camera, the appearance of the object may vary in accordance with the installation position of the camera. Because the shown orientation of the human figure, for example, may largely change, information less affecting on changes of the appearance may be necessary to store. In general, a feature amount less affecting on changes of the appearance may be defined, and a feature amount may be learned from a series of image features of a human figure captured by a camera. However, because one feature amount may include information regarding all appearances, accuracy of the identification may decrease. Even a tracked human figure captured by one camera may have different appearances in accordance with the movements of the human figure.

Japanese Patent Laid-Open No. 2015-2547 discloses a technology which determines the orientation of a human figure and calculates and stores a feature amount for each orientation. This technology may improve the accuracy of identification of a human figure by comparing feature amounts stored for an identical appearance of the human figure. However, the presence of a feature amount may possibly be determined with respect to an orientation to which an object human figure temporarily faces in a series of movements. In this case, because a few and instable feature amounts can be acquired, from which the object is determined as a different human figure and which may result in an improper association.

SUMMARY OF THE INVENTION

In order to provide a technology for improving precision for identifying an imaged object, an embodiment of the present invention provides an information processing apparatus having a detecting unit configured to detect an object from an image, an extracting unit configured to extract a feature amount of the object detected by the detecting unit, a managing unit configured to manage an element in the object detected by the detecting unit in association with the feature amount of the object in the element, and a deriving unit configured to derive a reliability indicative of a certainty for identifying an object with respect to the feature amount of the element.

Further features of the present invention will become apparent from the following description of exemplary embodiments with reference to the attached drawings.

DESCRIPTION OF THE EMBODIMENTS

Embodiments of the present invention will be described below with reference to drawings. An example will be described in which a human figure is detected from a captured image, and the detected human figure is tracked. However, the object may be, for example, an automobile or an animal instead of a human figure. Hereinafter, a target object to be detected and be tracked will be called an object.

First Embodiment

According to a first embodiment, feature amounts of an object are recorded by orientation or by region, and reliability of each of the feature amounts is calculated to identify the object. Identifying an object may include association between an object imaged by one imaging apparatus and an object imaged by another imaging apparatus or association of an object imaged at a predetermined time point by an imaging apparatus and an object imaged after the predetermined time point by the imaging apparatus.

Figure 1:
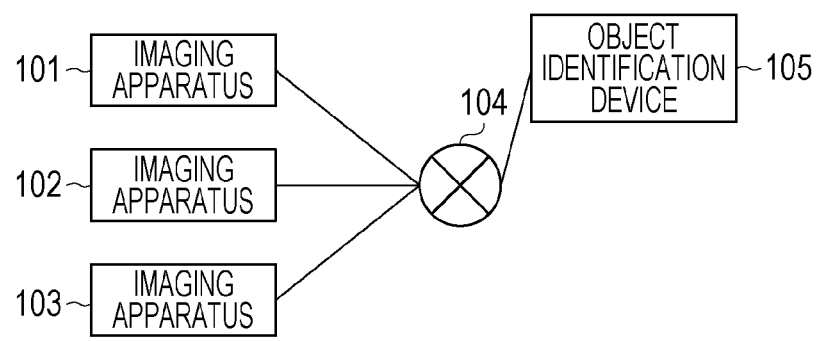
FIG. 1 illustrates an example of a system configuration of an information processing system.

FIG. 1 illustrates an example of a system configuration of an information processing system.

The information processing system includes a plurality of imaging apparatuses (cameras) 101, 102, and 103 and an object identification apparatus 105.

The imaging apparatuses 101, 102, and 103 transmit video data captured by them over a network 104. The object identification apparatus 105 is configured to identify an object appearing between imaging apparatuses based on video data captured by the imaging apparatuses and received over the network 104.

Figure 2:
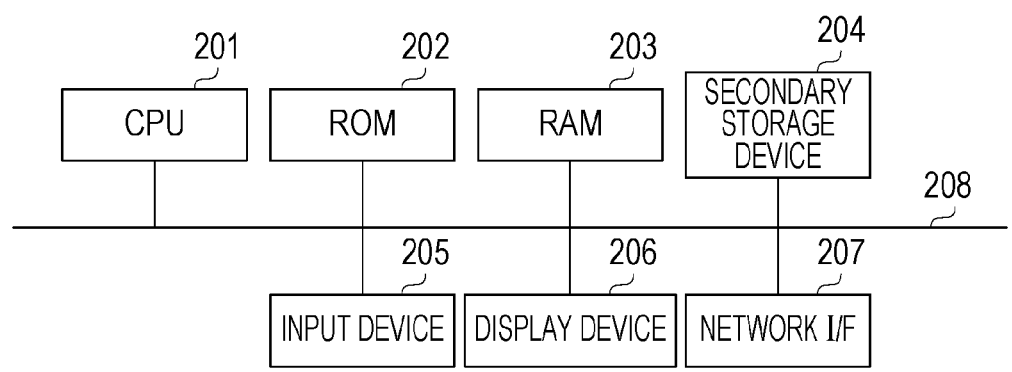
FIG. 2 illustrates an example of a hardware configuration of an object identification apparatus.

FIG. 2 illustrates an example of a hardware configuration of the object identification apparatus 105. The object identification apparatus 105 includes, in its hardware configuration, a central processing unit (CPU) 201, a read-only memory (ROM) 202, a random-access memory (RAM) 203, a secondary storage device 204, an input device 205, a display device 206, a network interface (I/F) 207, and a bus 208.

The CPU 201 executes a command in accordance with a program stored in the ROM 202 or the RAM 203.

The ROM 202 is a non-volatile memory and may store a program and data necessary for executing a process based on the program by the CPU 201.

The RAM 203 is a volatile memory and may store frame image data and temporary data such as a pattern identification result.

The secondary storage device 204 is a rewritable secondary storage device such as a hard disk drive and a flash memory and may store image information, an image processing program, and settings. These kinds of information may be transferred to the RAM 203 and be used by the CPU 201 to execute a process based on a program.

The input device 205 may be a keyboard or a mouse and notifies an input from a user to the CPU 201.

The display device 206 may be a cathode-ray tube or CRT or a liquid crystal display, for example, and displays a processing result from the CPU 201 to a user.

The network I/F 207 may be a modem or a local area network (LAN) for connecting to a network such as the Internet or an intranet.

The bus 208 connects these components to input/output data mutually.

The CPU 201 may execute a process based on a program stored in the ROM 202 or the secondary storage device 204 to implement a software configuration illustrated in FIG. 3 and processing in a flowchart illustrated in FIG. 7, which will be described below.

Figure 3:
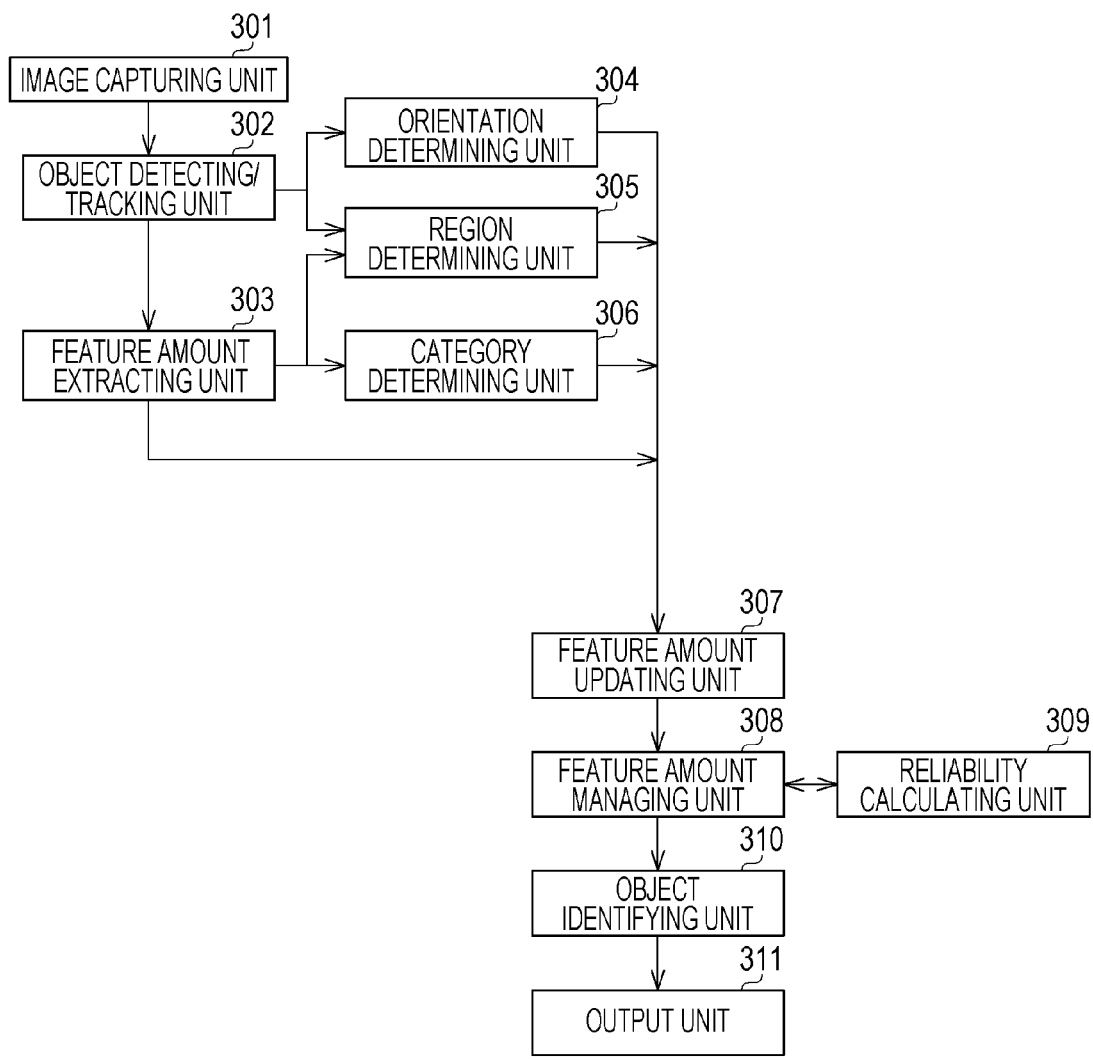
FIG. 3 illustrates an example of a software configuration of an object identification apparatus.

FIG. 3 is a block diagram illustrating the object identification apparatus 105. The object identification apparatus 105 includes an image capturing unit 301, an object detecting/tracking unit 302, a feature amount extracting unit 303, an orientation determining unit 304, a region determining unit 305, a category determining unit 306, a feature amount updating unit 307, a feature amount managing unit 308. The object identification apparatus 105 further includes a reliability calculating unit 309, an object identifying unit 310, and an output unit 311.

The image capturing unit 301 is configured to sequentially acquire images (image data) captured at predetermined time intervals by the imaging apparatuses 101 to 103 each having a lens and an imaging sensor and provide them to the object detecting/tracking unit 302.

The object detecting/tracking unit 302 performs processing for detecting an object from an image acquired from the image capturing unit 301. The object detecting/tracking unit 302 utilizes machine learning with a Support Vector Machine (SVM), for example, to create a classifier learning image features of an object. The object detecting/tracking unit 302 utilizes the classifier to acquire positional coordinates and size information of an object in the image acquired from the image capturing unit 301 for detection processing. The object detecting/tracking unit 302 may perform the same processing for detecting the position and size of a region of the object. For example, in a case where the object is a human figure, the object detecting/tracking unit 302 detects a region such as the head, the body, an arm and a leg. The object detecting/tracking unit 302 may detect a position and an orientation of each region collectively as orientation information. It should be understood that the method for detecting an object by the object detecting/tracking unit 302 is not limited to use of the classifier but may be processing for detecting an object from an image. For example, pattern matching may be applied to detect an object from an image.

The object detecting/tracking unit 302 performs a tracking process based on information regarding a detected object.

The tracking process associates an object detected in an image of one frame and an object detected in an image of another frame in one imaging apparatus based on a feature in the images and a positional relationship between the images. In a case where an object detection fails and the current image does not have an object to be associated with an object detected in an image of another frame, the object detecting/tracking unit 302 may use an estimated motion according to a Kalman Filter, for example, to complement the association result. If no object is detected to be associated for a predetermined time period or longer, the object detecting/tracking unit 302 ends the tracking process. The object detecting/tracking unit 302 gives a unique ID to each of the associated objects. The object detecting/tracking unit 302 provides object information including an ID, positional coordinates, size information, an image acquisition time, and information describing the imaging apparatus to the feature amount extracting unit 303, the orientation determining unit 304, and the region determining unit 305.

In the object detecting/tracking unit 302, the detection function and the tracking function may be integrated or may be provided separately.

The feature amount extracting unit 303 extracts a feature amount of an object from a target region in an image based on the positional coordinates of the object included in the object information. A feature amount of an object may be a color, a brightness, or an edge, for example, extracted from a target region. The feature amount extracting unit 303 may handle at least one of the color, brightness, and edge as a feature amount or may handle an arbitrary combination thereof as a feature amount. The feature amount extracted by the feature amount extracting unit 303 may be a histogram representing such a color, brightness, or edge. The feature amount extracting unit 303 may extract a feature amount of an object for each target region acquired by the object detecting/tracking unit 302. The target region may be the head, the body, an arm or a leg, for example.

The feature amount extracting unit 303 may extract a feature of an object indicating whether the object is carrying a bag, whether the object is wearing sunglasses, or whether the object is bearded. These features may be represented by values in a range from 0 to 1. For example, with respect to the presence/absence of a bag, 0 indicates the absence of a bag while 1 indicates the presence of a bag. When the presence/absence may not be clearly determined only from an image, an intermediate value such as 0.5 may be used. The feature amount extracting unit 303 may extract a feature representing the age, sex, height, clothes, or body shape of an object. The presence/absence of a bag, sunglasses, a beard and the age, sex, height, clothes, and body shape will collectively called as a feature identification category (category). The feature identification category is usable for identifying a feature of an object.

The feature amount extracting unit 303 may extract a feature amount by using a Local Binary Pattern (LBP) feature amount or a Histograms of Oriented Gradients (HOG) feature amount being a shape feature or a texture feature extracted by using a Gabor filter or a Schmid filter. The classifier may be based on a scheme such as a support vector machine (SVM). The feature amount extracting unit 303 associates the acquired feature amount of an object and type information of the used classifier with the identification (ID) of the object acquired by the object detecting/tracking unit 302 and provides them to the region determining unit 305, the category determining unit 306, and the feature amount updating unit 307.

The orientation determining unit 304 creates a classifier in the object detecting/tracking unit 302 for each orientation of an object to determine the orientation of the object from information regarding the highly reliable classifier. Alternatively, the orientation determining unit 304 estimates the direction of movement from a movement of an object between frames and defines the direction that the object moves as a front direction to determination the orientation of the object on a display screen. For example, when an object moves to the right, it is determined that the object faces to the right and that the orientation of the object in a display screen is the right orientation. The orientation determining unit 304 provides the acquired orientation of the object to the feature amount updating unit 307.

The region determining unit 305 associates the detection result from the target region acquired by the object detecting/tracking unit 302 and the feature amount of the region extracted by the feature amount extracting unit 303. In this case, whether the region detected by the object detecting/tracking unit 302 is correct may be determined. The determination of a region by using a feature amount may provide accurate region determination. The region determining unit 305 then sends region information to the feature amount updating unit 307 where the feature amount updating unit 307 provides region information that is information associating a region and a feature amount of the region.

The category determining unit 306 determines the feature identification category from the type of the classifier utilized by the feature amount extracting unit 303. For example, the category determining unit 306 may determine that the feature identification category is the presence/absence of a beard in a case where a classifier for detecting the presence/absence of a beard is utilized. The category determining unit 306 provides the acquired discrimination result of the feature identification category to the feature amount updating unit 307. The method for determining a feature identification category is not limited thereto, but various methods may be used. For example, meta data describing a feature identification category may be used.

The feature amount updating unit 307 updates to a feature amount of an object based on the feature amount acquired from the feature amount extracting unit 303, the orientation of the object acquired from the orientation determining unit 304, the region information acquired from the region determining unit 305, and the feature identification category acquired from the category determining unit 306. Hereinafter, the orientation, region, and feature identification category of an object will collectively be called an attribute. An element included in the attribute will be called an attribute element. For example, an angle of an orientation, a region, and a feature identification category may be attribute elements (element). The feature amount updating unit 307 performs update processing on feature amounts of one object managed by the feature amount managing unit 308 every time information regarding the object is acquired by the object detecting/tracking unit 302. The feature amount updating unit 307 provides an acquired feature amount in association with the ID of an object to the feature amount managing unit 308 in a case where a target feature amount has not been acquired in the past. The feature amount updating unit 307 updates feature amounts for each attribute element. For example, the feature amount updating unit 307 updates a feature amount acquired when the object orientation is front as a front feature amount and a feature amount acquired when the object orientation is right as a right feature amount. The feature amount updating unit 307 updates region information by region. The updating may be performed by cumulatively calculating feature amounts or additionally storing feature amounts every time a feature amount is acquired. The number of times of updating of feature amounts for each attribute element is provided to the feature amount managing unit 308 as the number of frames from which feature amounts are acquired.

The feature amount managing unit 308 manages (or records) feature amounts updated by the update processing performed by the feature amount updating unit 307 for each attribute element. For example, the feature amount managing unit 308 manages a feature amount when the object orientation is front as a front feature amount and a feature amount when the object orientation is right as a right feature amount. The feature amount managing unit 308 also manages region information for each region.

The reliability calculating unit 309 calculates (or derives) a reliability for a feature amount managed by the feature amount managing unit 308. The reliability here is a numerical value indicative of the probability of success of identification of an object in the processing for identifying an object based on an update feature amount. In other words, the reliability is a numerical value indicative of the certainty of success of identification of an object. As the value increases, the success probability increases. The reliability calculating unit 309 defines the reliability for each attribute element and calculates it based on the total number of frames (or number of frames) used for calculating a feature amount or the resolution of a region (target region) of the object from which the feature amount is extracted. The reliability calculating unit 309 may calculate the reliability based on both of the total number of frames (or number of frames) from which the feature amount is calculated and the resolution of the target region. The target region may be an entire human figure facing to the left with respect to the orientation, a region such as the head or the body with respect to the region, and a beard part with respect to the category, for example.

For example, in a case where an object facing to the front is imaged for a long period of time, front feature amounts are continuously acquired, which results in stable feature amounts. Thus, the reliability of the front feature amounts is higher than the reliabilities of other feature amounts. When a human figure facing to the right approaches to the camera and is imaged largely, a high-resolution and high quality feature amount of the right orientation can be acquired. Thus, the reliability for the right orientation is higher than the reliabilities of the other feature amounts. Conversely, when an object faces to the back instantly or faces to the back at a position far away from the camera, an instable and low quality feature amount can be acquired. Thus, the reliability for the back orientation is lower than the reliabilities of the other feature amounts. The reliability calculating unit 309 may cumulatively calculate the reliabilities to gradually increase the reliability or may re-calculate the reliability every time and keep low reliability if every calculated reliability is low. Here, as the number of frames increases, the reliability increases because more information can be collected. As the resolution increases, the reliability increases.

Figure 4A:
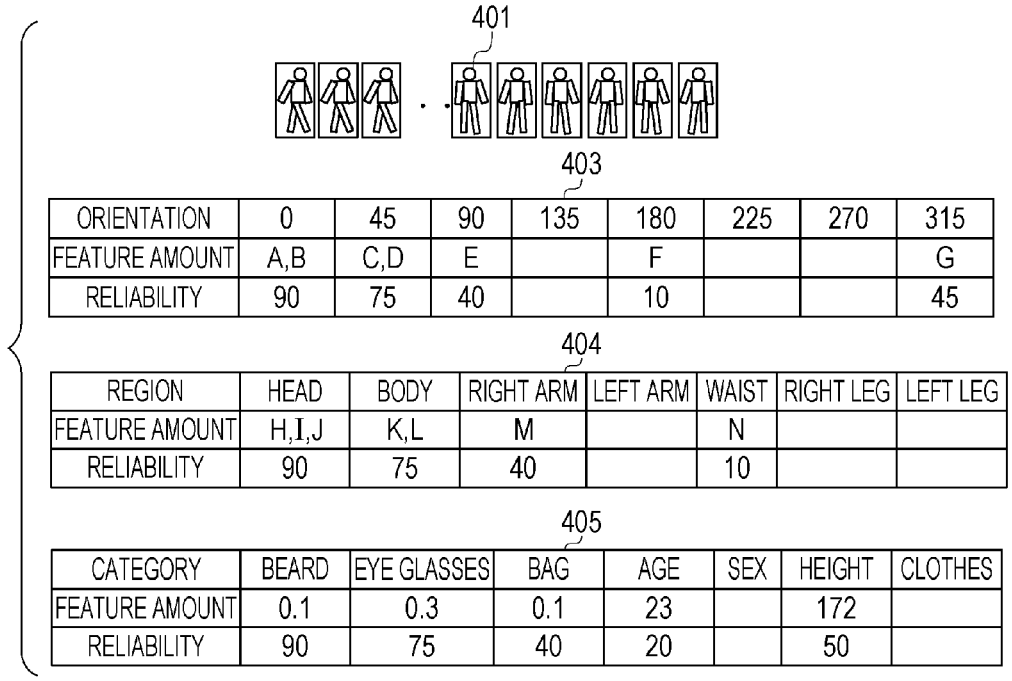
FIGS. 4A and 4B illustrate an example of feature amounts of an object.
Figure 4B:
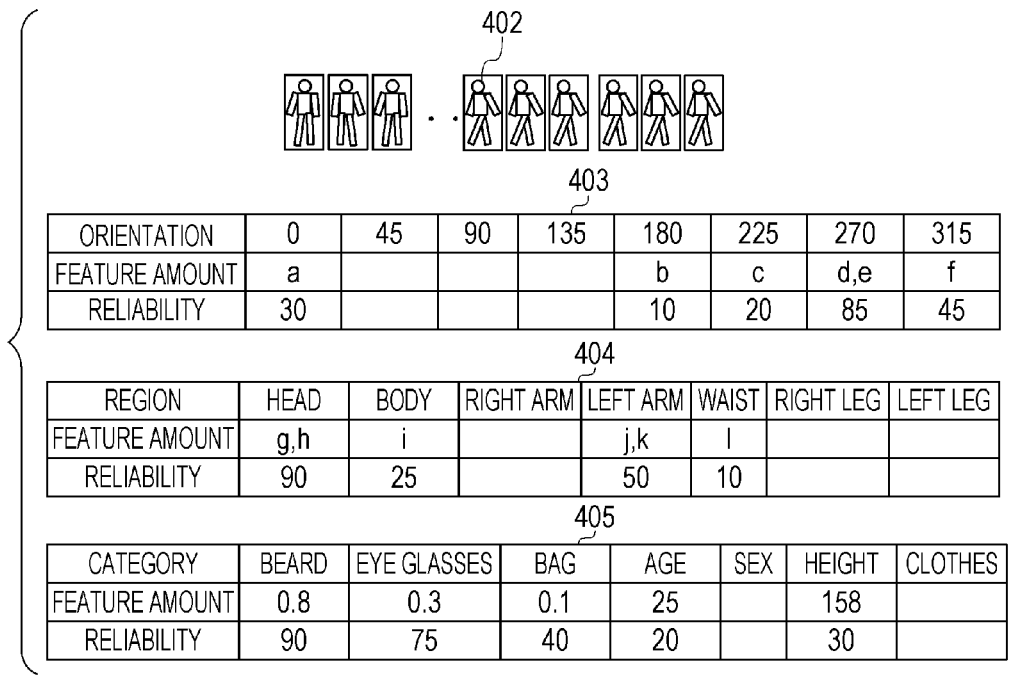

FIGS. 4A and 4B illustrate examples of feature amounts of an object recorded by the feature amount managing unit 308. An image group 401 of an object 1 and an image group 402 of an object 2 can be acquired from a series of tracking results by the object detecting/tracking unit 302. Feature amounts of the objects are calculated from the image group 401 and the image group 402, and the feature amount is updated for each attribute element. Thus, an orientation-based feature amount 403, a region-based feature amount 404, and a feature-identification-category-based feature amount 405 are acquired. The orientation-based feature amount 403 manages by angle the feature amounts corresponding to information regarding orientations. In this case, the front, right, back, and left directions are defined as 0, 90, 180, and 270 degrees, respectively by equally dividing 360-degree direction to represent the orientation of an object. An angle of the orientation of an object is managed in association with the closest angle of those angles. FIGS. 4A and 4B divide 360-degree orientations by 45 degrees, but may divide them in more detail or may be divided into the front, back, right and left. In the examples in FIGS. 4A and 4B, feature amounts A and B are saved in association with the orientation 0 degrees in the orientation-based feature amount 403 for the object 1, and the reliability is 90. Also, feature amounts d and e are saved in association with the orientation 270 degrees in the orientation-based feature amount 403 for the object 2, and the reliability is 85. The region-based feature amount 404 manages feature amounts corresponding to regions of an object by region of the object. Finer granularity of region may be defined. The orientation-based feature amount 403 and region-based feature amount 404 managed by the feature amount managing unit 308 include information describing color, brightness, and edge, for example, extracted by the feature amount extracting unit 303, as described above.

The feature-identification-category-based feature amount 405 manages feature amounts for each feature identification category. The reliability calculating unit 309 provides an updated feature amount and the reliability for the feature amount to the feature amount managing unit 308. The feature amounts managed by the feature amount managing unit 308 are represented by values in a range of 0 to 1 extracted by the feature amount extracting unit 303 in the feature-identification-category-based feature amount 405, as described above.

The object identifying unit 310 reads out feature amounts from the feature amount managing unit 308, calculates a distance between objects (inter-object distance) to acquire a similarity, and identification is performed based on the similarity. The inter-object distance may be calculated by learning Euclid distance or Mahalanobis distance in advance. The object identifying unit 310 may perform the identification by using various values representing the similarity between object instead of the inter-object distance.

When the object identifying unit 310 calculates the inter-object distance, the feature amounts are compared for each attribute element. Roughly three types of attribute are provided, and how they are compared will be described hereinafter.

A first type of attribute is an orientation of an object. How orientation-based feature amounts are compared will be described with reference to the orientation-based feature amount 403 in FIGS. 4A and 4B. First of all, for the comparison of orientation-based feature amounts, feature amounts belonging to one orientation are compared in accordance with the defined orientation. Referring to FIGS. 4A and 4B, among feature amounts of 0 degrees, the object 1 holds A and B and the object 2 holds a. The object identifying unit 310 thus compares the features A and a and B and a to calculate a distance between the feature amounts. As the distance between feature amounts decreases, the similarity between the objects increases. Alternatively, the object identifying unit 310 may integrate the features A and B and compare the integration result and a. In other words, the identification method is not limited if feature amounts belonging to the orientation 0 degrees of each object can be compared. Among feature amounts belonging to the orientation 45 degrees, the object 1 holds feature amounts C and D, and the object 2 holds no feature amount. In this case, the object identifying unit 310 does not compare the feature amounts and determines that no similarity exists between the feature amounts belonging to the orientation 45 degrees, and excludes them from the inter-object distance calculation. The object identifying unit 310 performs this processing for all orientations and finally integrates (by averaging, for example) the inter-object distances to provide a comparison result of the orientation-based feature amounts. In the comparison for the orientations, the object identifying unit 310 may compare feature amounts belonging to the orientation 45 degrees with the feature amounts of adjacent orientations 0 degrees and 90 degrees. In other words, the comparison range is given for illustration purpose only, and the identification method is not limited if the involved calculations are performed in consideration of orientations.

A second attribute is a region of an object. The region-based feature amounts of an object can be compared in the same manner as the comparison with respect to the orientation-based feature amounts. In other words, the comparison of region-based feature amounts compares feature amounts belonging to one region. Referring to FIGS. 4A and 4B, among feature amounts belonging to the head, the object 1 holds feature amounts H, I, and J, and the object 2 holds feature amounts g and h. Thus, the object identifying unit 310 compares these feature amounts to acquire a distance between the feature amounts. The same processing is performed for other regions. The object identifying unit 310 may integrate feature amounts for comparison, like the comparison of orientation-based feature amounts. The processing for acquiring a distance between feature amounts by comparing them may be performed on all orientations, and the inter-object distances are integrated (by averaging, for example) finally to provide a comparison result of the region-based feature amounts. This processing is not limited to a specific method if calculations in consideration of a region are performed.

A third attribute is a feature identification category. For comparison between feature-identification-category-based feature amounts, the object identifying unit 310 compares feature amounts for each feature identification category. Referring to FIGS. 4A and 4B, among feature amounts related to a beard, the object 1 holds 0.1 and the object 2 holds 0.8. Thus, the object identifying unit 310 compares 0.1 and 0.8. In this case, the object identifying unit 310 acquires a value such that the inter-object distance decreases as the value of the feature amount decreases. The object identifying unit 310 also applies the same calculation to the age, height, and so on and integrates the inter-object distances to provide a comparison result with respect to the feature-identification-category-based feature amounts.

In the comparison between feature amounts related to an attribute, the object identifying unit 310 may exclude a feature amount having a reliability lower than a predetermined threshold value from the comparison. In other words, the object identifying unit 310 may compare feature amounts having their reliabilities equal to or higher than the threshold value in the comparison of feature amounts related to an attribute element. For example, for comparison between orientation-based feature amounts illustrated in FIGS. 4A and 4B with respect to the feature amount related to orientation 180 degrees, the object 1 and object 2 hold feature amounts F and b, respectively, while both having a reliability as low as 10. Thus, the object identifying unit 310 excludes the feature amounts from targets of the feature amount comparison. In this example, though both of the objects have feature amounts having a low reliability value, the object identifying unit 310 may exclude them from targets of the comparison if the reliability of one feature amount is lower than a predetermined threshold value. Exclusion of a feature amount lower having its reliability lower than a threshold value from targets of the feature amount comparison can improve the accuracy of identification.

Finally, the object identifying unit 310 compares the calculated inter-object distance with a predetermined threshold value and determines that the objects are identical if the calculated inter-object distance is equal to or lower than the threshold value (if the similarity is high). The object identifying unit 310 then provides the distance between the objects or identification information of the objects to the output unit 311.

The output unit 311 displays a result that the objects are identified on the display device 206 for presentation to a user. As an example of the presentation, the output unit 311 may display an objects identified by the object identifying unit 310 among the objects displayed on the display device 206 through the input device 205 with respect to the object selected by a user from the left to the right in increasing order of the inter-object distance. The display of the objects from the left is given for illustration purpose only, and the objects may be displayed from the right or from the top in accordance with the configuration of a display screen for the presentation. The output unit 311 may display on the display device 206 a display screen including a graph such as a radar chart showing reliability by attribute as reference information for a user. The display screen may include a search area, for example, usable by a user for narrowing down attribute elements through the input device 205 so that the output unit 311 can display a result of a re-calculation of an inter-object distance by the object identifying unit 310 based on the selected attribute elements.

Figure 5:
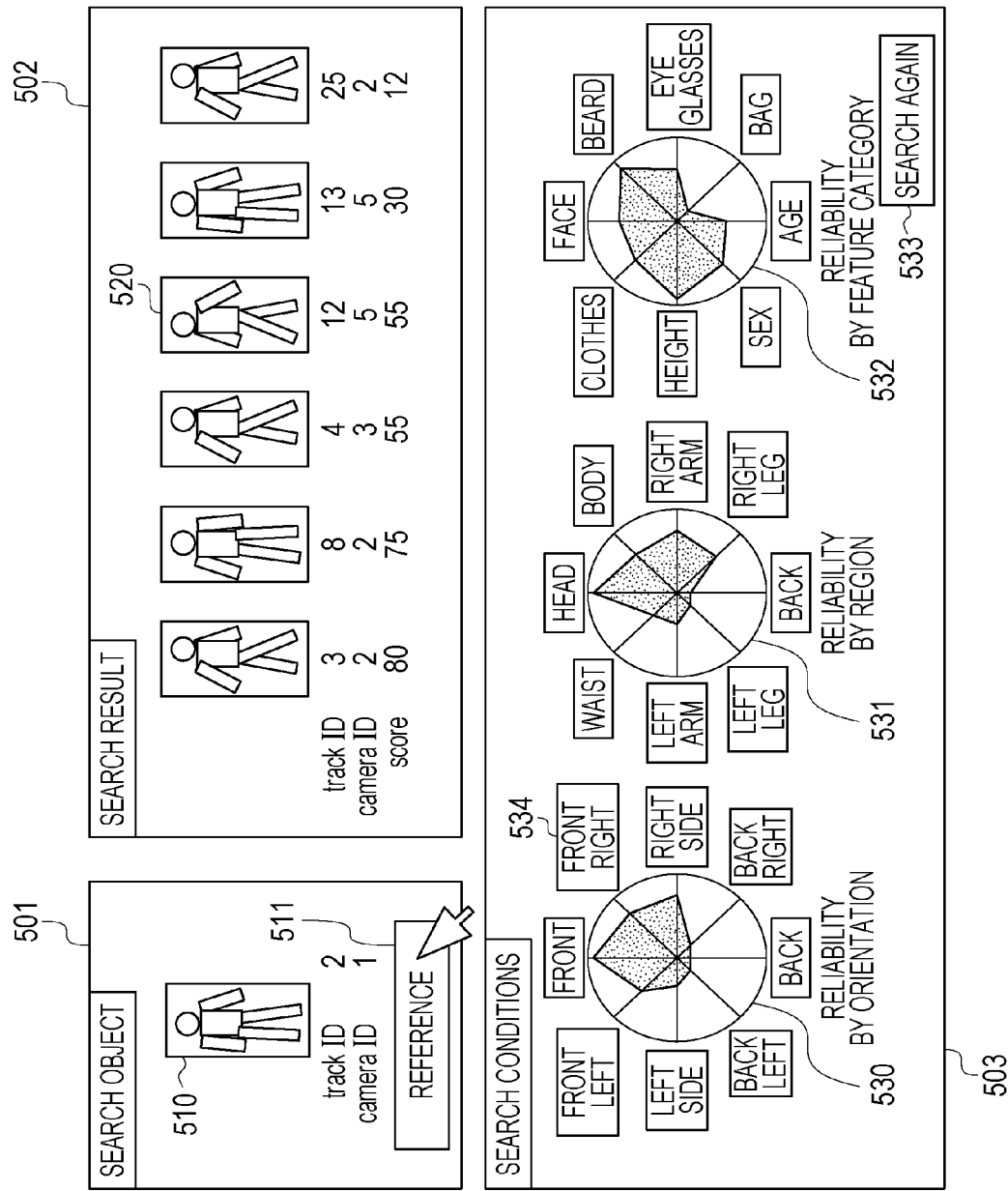
FIG. 5 illustrates an example of a display screen.

FIG. 5 illustrates an example of the display screen. The display screen illustrated in FIG. 5 includes a select area 501 in which a reference object for search is selected, a search result display area 502 displaying a search result, and a setting area 503 in which a search condition can be defined. The select area 501 includes search object information 510 representing a query image of a search object and object information such as an ID and a reference button 511 through which a selection input is received.

When a user selects a reference button 511 displayed on the display device 206 through the input device 205, the object identifying unit 310 performs processing for selecting an object. In other words, the object identifying unit 310 in response to selection of an object causes the output unit 311 to display information regarding the selected object in the search object information 510. The search result display area 502 displays a list of identified objects 520 from the left in increasing order of the distance between the objects. A user may designate an object matched with a search object based on the search result. The setting area 503 includes an orientation-based reliability graph 530, a region-based reliability graph 531, a feature-identification-category-based reliability graph 532, a re-search button 533, and a search condition setting button 534. A user determines a narrow-down condition for search based on the display in the search result display area 502 and the reliability graphs 530 to 532. A user then instructs the object identification apparatus 105 to change a search condition by, for example, selecting the search condition setting button 534 based on the determined search condition. The object identifying unit 310 in response to selection of the re-search button 533 performs re-searching under the search condition changed in accordance with the instruction. It is assumed here, for example, that a user selects "front" as an orientation of the object, "the head" as a region, and "beard" as a feature identification category. Thus, the object identifying unit 310 performs the identification process again under the selected condition.

Here, referring to FIG. 5 and FIG. 6, which will be described below, a track ID is identification information added to one object (or one human figure). For example, the object detecting/tracking unit 302 adds identification information to each detected object. A camera ID is identification information by which an imaging apparatus is identifiable. The term "score" refers to a similarity between objects.

Illustrating the select area 501, the search result display area 502, and the setting area 503 displayed in one display screen in FIG. 5, for example, an embodiment of the present invention is not limited thereto. For example, the select area 501, search result display area 502, and setting area 503 may be displayed on separate display screens or may be displayed on one display screen in arbitrary combination. The same is true in FIG. 6, FIG. 8, and so on, which will be described below.

Figure 6:
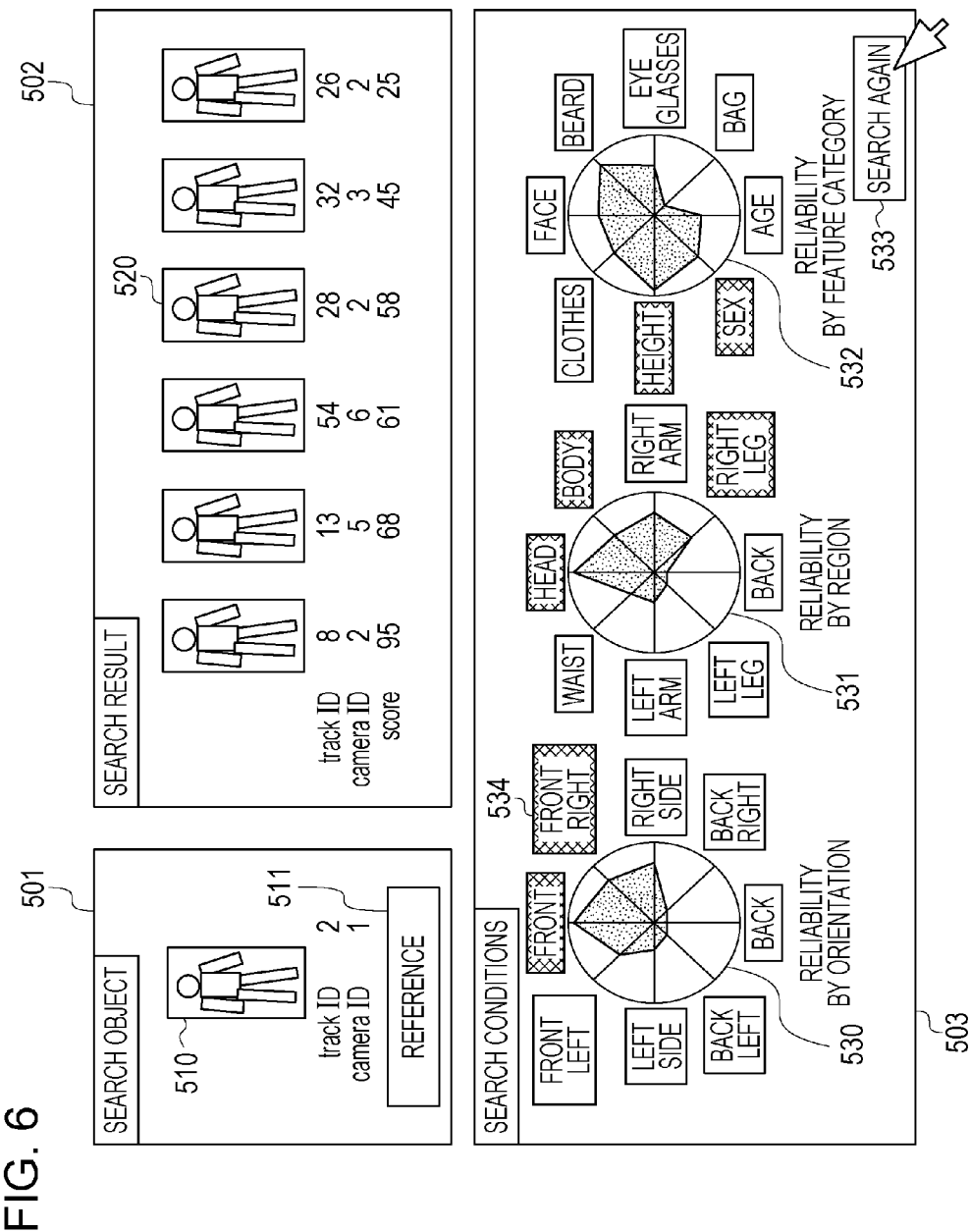
FIG. 6 illustrates an example of a display screen in a case where a search condition is changed to re-search.

FIG. 6 illustrates an exemplary display screen when a search condition is changed to perform re-searching. In the example in FIG. 6, "front" and "front right" are selected as orientations, "the head", "body", and "right leg" are selected as regions, and "height" and "sex" are selected as feature identification categories. Performing re-searching under the conditions above can change the result to be displayed in the search result display area 502.

Here, the output unit 311 displays, in the orientation-based reliability graph 530, the region-based reliability graph 531, the feature-identification-category-based reliability graph 532, the reliability of a search reference object selected in the select area 501. This configuration allows a user to select a search condition having a higher reliability than other reliabilities in accordance with the reliabilities of the objects displayed on the graphs in the setting region.

The image acquisition by the image capturing unit 301 is not limited to input from the imaging apparatuses 101 to 103, but images may be input by reading recorded video or streaming over a network, for example.

The tracking by the object detecting/tracking unit 302 may be processing for tracking within an image an object detected from the image, and is not limited to the aforementioned method.

As a result of the comparison, the object identifying unit 310 may manage information regarding identified objects by changing the ID of the object to the identified ID in the object information managing unit configured to manage information regarding the identified object. In this case, the output unit 311 may render and display graphic representations of the position and size of an object such as a rectangle circumscribed on the object and the ID of the object over an image acquired by the image capturing unit 301.

Figure 7:
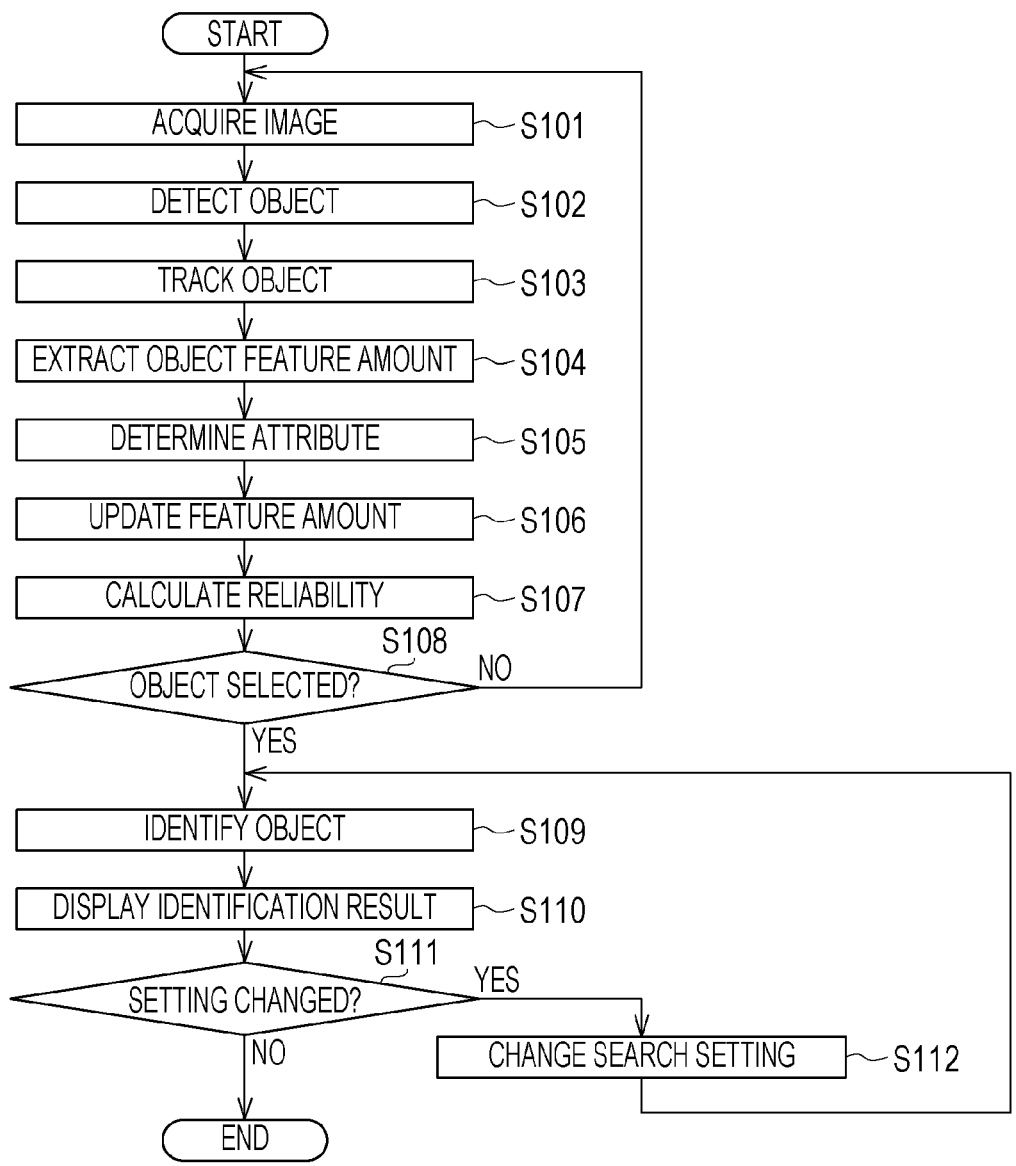
FIG. 7 is a flowchart illustrating an example of information processing.

FIG. 7 is a flowchart illustrating an example of information processing for storing a feature amount of an object and performing identification of a selected object on continuously input images.

In S101, the image capturing unit 301 acquires an image.

In S102, the object detecting/tracking unit 302 performs processing for detecting an object from the acquired image.

Next, in S103, the object detecting/tracking unit 302 executes tracking processing to track the object based on the acquired object information.

Next, in S104, the feature amount extracting unit 303 extracts a feature amount of the object based on the acquired object information.

At the same time, in S105, the orientation determining unit 304, the region determining unit 305, and the category determining unit 306 determine attribute elements of the object.

After the processing by the orientation determining unit 304, the region determining unit 305, and the category determining unit 306 ends, the feature amount updating unit 307 in S106 performs the following processing. That is, the feature amount updating unit 307 updates feature amounts of the object managed by the feature amount managing unit 308 based on the extracted feature amount and the determined attribute elements.

After the processing by the feature amount updating unit 307 ends, the reliability calculating unit 309 in S107 calculates a reliability based on an attribute element of the feature amount managed by the feature amount managing unit 308. The processing in S107 is an example of processing by control for acquiring a reliability representing the probability for identifying an object.

In S108, the object identifying unit 310 determines whether an object is selected in the select area 501. If it is determined that an object is selected in the select area 501 (Yes in S108), the object identifying unit 310 advances the processing to S109. If it is determined that an object is not selected (No in S108), the object identifying unit 310 returns the processing to S101.

In S109, the object identifying unit 310 performs processing of calculating the distance between the objects and identifying the objects.

After the processing by the object identifying unit 310 ends, the output unit 311 in S110 outputs the result to the display device 206, for example.

In S111, the object identifying unit 310 determines whether a setting for a search condition is changed in the setting area 503. If it is determined that a setting for a search condition is changed in the setting area 503 (Yes in S111), the object identifying unit 310 advances the processing to S112. If not (No in S111) on the other hand, the object identifying unit 310 ends the processing in the flowchart in FIG. 7.

In S112, the object identifying unit 310 changes the corresponding search condition in accordance with the changed setting. The object identifying unit 310 returns the processing to S109 after the processing in S112.

The execution of the processing from acquiring an image to updating a feature amount may be performed at all times irrespective of the presence/absence of an object selection or may be performed at any time point.

By performing the processing according to this embodiment as described above, the object identification apparatus 105 can store feature amounts of an object from continuously input images so that a selected object can be identified.

Second Embodiment

Figure 8:
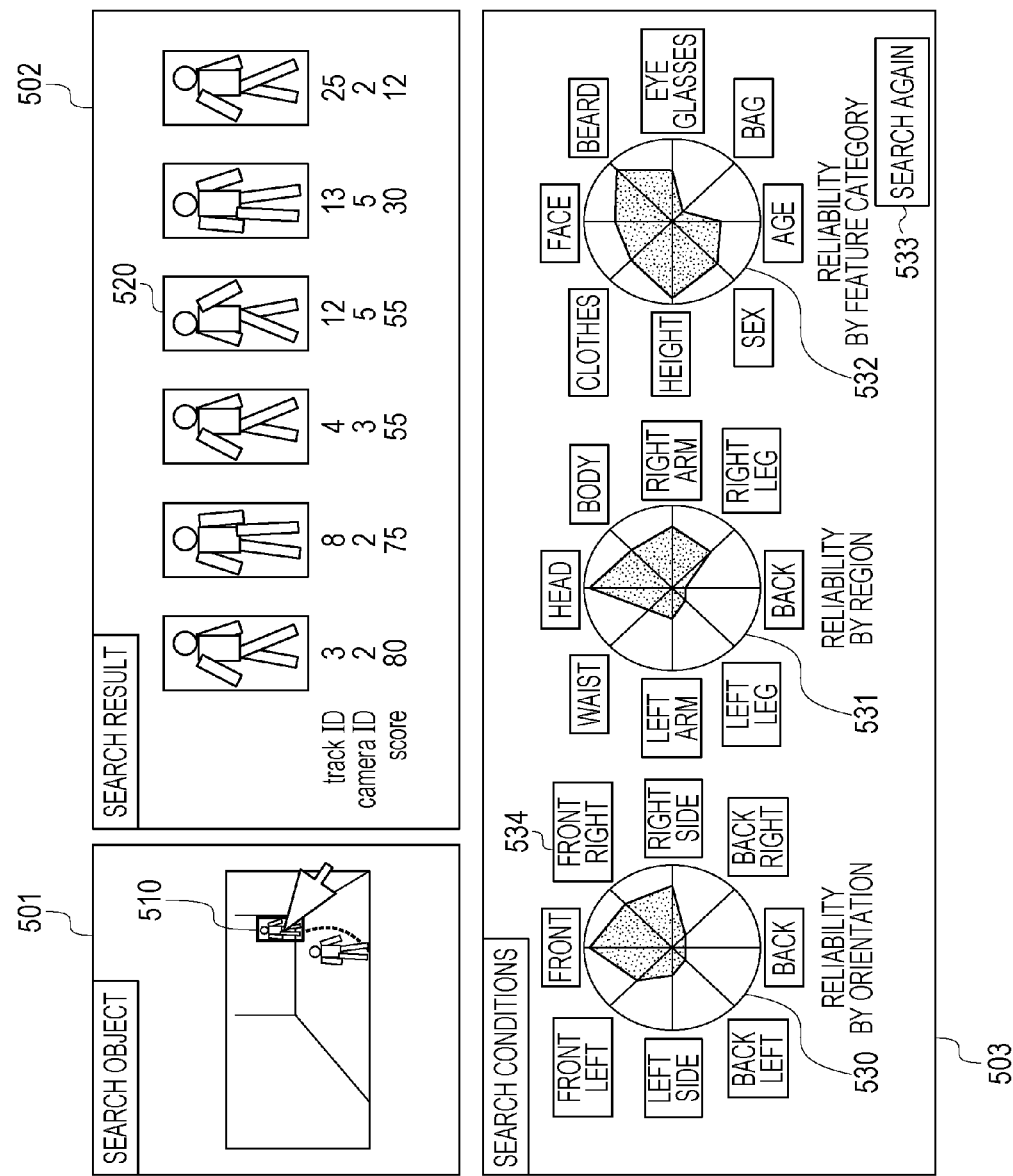
FIG. 8 illustrates another example of a selection of a search object.

According to the first embodiment, the output unit 311, for example, displays in the select area 501 a registered object whose feature amounts are already managed in the feature amount managing unit 308 as a search object in accordance with a user operation through the input device 205, for example, as illustrated in FIGS. 5 and 6, for example. However, the output unit 311, for example, may display in the select area 501 an unregistered object being captured by the imaging apparatuses 101 to 103 as a search object in accordance with a user operation through the input device 205, for example. FIG. 8 illustrates another example of a selection of a search object. A user may operate the input device 205, for example, to select as a search object an unregistered object being captured by the imaging apparatuses 101 to 103 and being displayed in the select area 501 in FIG. 8.

When a search object is selected, the object identification apparatus 105 according to this embodiment performs detecting processing and tracking processing on an object on a selected image being captured, extracts feature amounts, determines the orientation of the object, a target region, and the feature identification category, registers the feature amounts, and calculates the reliability. The object identification apparatus 105 according to this embodiment then performs the identification process between the selected object and another registered object and outputs a processing result.

By performing the processing according to this embodiment, the object identification apparatus 105 identifies a selected object.

Other Embodiments

According to the present invention, a program implementing one or more functions of the aforementioned embodiments to a system or an apparatus over a network or through a storage medium. An embodiment of the present invention may be implemented by processing performed by reading out and executing the program by one or more processors in a computer in the system or apparatus. An embodiment of the present invention may be implemented by a circuit (such as an ASIC—an application-specific integrated circuit) implementing one or more functions.

Having described embodiments of the present invention in detail above, it should be understood that the present invention is not limited by a specific embodiment. Having described that, according to the aforementioned embodiments, example attributes are an orientation of an object, a region of an object, and a category of a feature amount, one or an arbitrary combination of an orientation of an object, a region of an object, and a category of a feature amount may be applied instead.

In the processing according to the aforementioned embodiments, feature amounts may be stored based on an orientation of an object, a region of an object, and a category of a feature amount, and the reliabilities of the feature amounts are calculated every time an update is made. Features having higher reliabilities may be compared to identify the object with improved precision of identification.

Therefore, by performing the processing according to the aforementioned embodiments, a technology for improving the precision of identification of an object can be provided.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-161265, filed Aug. 18, 2015, which is hereby incorporated by reference herein in its entirety.

What is claimed is:

1. An information processing apparatus comprising:
one or more processors; and
memory storing instructions that, when executed by the one or more processors, cause the information processing apparatus to function as:
a detecting unit configured to detect an object from an image,
an extracting unit configured to extract a feature amount of the detected object,
a deriving unit configured to derive a reliability for an extracted feature amount, wherein the derived reliability is indicative of a certainty for identifying an object with respect to the extracted feature amount,
a managing unit configured to manage an element in the detected object in association with the extracted feature amount and the derived reliability, and
an identifying unit configured to identify a selected object among a plurality of images,
wherein, in a case where the information processing apparatus receives input to identify a selected object based on a search condition that includes a selected feature amount associated with an element, the identifying unit identifies the selected object among the plurality of images based on the search condition, feature amounts associated with elements managed by the managing unit, and derived reliabilities.

2. The information processing apparatus according to claim 1, wherein the executed instructions further cause the one or more processors to function as an output unit configured to output the reliability of the selected feature amount of the selected object.

3. The information processing apparatus according to claim 2, wherein the output unit outputs a result of the identification.

4. The information processing apparatus according to claim 2, wherein the feature amounts associated with elements managed by the managing unit and utilized by the identifying unit in the identification is limited to feature amounts having reliabilities equal to or higher than a threshold value among the feature amounts associated with elements managed by the managing unit.

5. The information processing apparatus according to claim 1, wherein the deriving unit derives the reliability based on a number of frames from which the feature amounts are extracted.

6. The information processing apparatus according to claim 1, wherein the deriving unit derives the reliability based on a resolution of a target region from which the feature amount is extracted.

7. The information processing apparatus according to claim 1, wherein the element is one or an arbitrary combination of an orientation of an object, a region of an object, and a category for identifying a feature.

8. The information processing apparatus according to claim 7, wherein the category is at least one of presence/absence of a bag, sunglasses, or a beard, age, sex, height, clothes, or body shape.

9. The information processing apparatus according to claim 1, wherein the extracting unit extracts the feature amount based on color, brightness, or edge of the object.

10. The information processing apparatus according to claim 1, wherein the deriving unit derives, for each element, a reliability indicative of a certainty for identifying an object by using a number of frames from which a feature amount is acquired and a number of pixels of an object for which a feature amount is calculated.

11. A method for an information processing apparatus, the method comprising:
detecting an object from an image;
extracting a feature amount of the detected object;
deriving a reliability for an extracted feature amount, wherein the derived reliability is indicative of a certainty for identifying an object with respect to the extracted feature amount;
managing an element in the detected object in association with the extracted feature amount and the derived reliability; and
identifying a selected object among a plurality of images;
wherein, in a case where the information processing apparatus receives input to identify a selected object based on a search condition that includes a selected feature amount associated with an element, identifying includes identifying the selected object among the plurality of images based on the search condition, managed feature amounts associated with elements, and derived reliabilities.

12. The method according to claim 11, further comprising outputting the reliability of the selected feature amount of the selected object.

13. The method according to claim 12, wherein outputting includes outputting a result of the identification.

14. The method according to claim 12, wherein the managed feature amounts associated with elements and utilized in the identification is limited to feature amounts having reliabilities equal to or higher than a threshold value among the managed feature amounts associated with elements.

15. The method according to claim 11, wherein deriving includes deriving the reliability based on a number of frames from which the feature amounts are extracted.

16. The method according to claim 11, wherein deriving includes deriving the reliability based on a resolution of a target region from which the feature amount is extracted.

17. The method according to claim 11, wherein the element is one or an arbitrary combination of an orientation of an object, a region of an object, and a category for identifying a feature, and wherein the category is at least one of presence/absence of a bag, sunglasses, or a beard, age, sex, height, clothes, or body shape.

18. The method according to claim 11, wherein extracting includes extracting the feature amount based on color, brightness, or edge of the object.

19. The method according to claim 11, wherein deriving includes deriving, for each element, a reliability indicative of a certainty for identifying an object by using a number of frames from which a feature amount is acquired and a number of pixels of an object for which a feature amount is calculated.

20. A non-transitory computer readable recording medium storing a program to cause an information processing apparatus to perform a method, the method comprising:

detecting an object from an image;

extracting a feature amount of the detected object;

deriving a reliability for an extracted feature amount, wherein the derived reliability is indicative of a certainty for identifying an object with respect to the extracted feature amount;

managing an element in the detected object in association with the extracted feature amount and the derived reliability; and identifying a selected object among a plurality of images;

wherein, in a case where the information processing apparatus receives input to identify a selected object based on a search condition that includes a selected feature amount associated with an element, identifying includes identifying the selected object among the plurality of images based on the search condition, managed feature amounts associated with elements, and derived reliabilities.

21. The information processing apparatus according to claim 1, wherein, to increase precision of the information processing apparatus in identifying the selected object among the plurality of images, the identifying unit excludes from the identification a feature amount having a reliability derived by the deriving unit that is lower than a predetermined threshold value.

22. The information processing apparatus according to claim 1, wherein the information processing apparatus is an object identification device configured to be in communication with a plurality of video cameras over a network.

* * * * *